(12) United States Patent
Pontious

(10) Patent No.: US 10,380,619 B2
(45) Date of Patent: Aug. 13, 2019

(54) DRIVERS LICENSE PARSER

(71) Applicant: Comenity LLC, Columbus, OH (US)

(72) Inventor: Tim Pontious, Columbus, OH (US)

(73) Assignee: Comenity LLC, Columbus, OH (US)

( * ) Notice: Subject to any disclaimer, the term of this patent is extended or adjusted under 35 U.S.C. 154(b) by 644 days.

(21) Appl. No.: 14/637,330

(22) Filed: Mar. 3, 2015

(65) Prior Publication Data

US 2015/0248691 A1 Sep. 3, 2015

Related U.S. Application Data

(60) Provisional application No. 61/947,360, filed on Mar. 3, 2014.

(51) Int. Cl.
| | | |
|---|---|---|
| *G06Q 30/02* | (2012.01) | |
| *G06F 16/955* | (2019.01) | |
| *G06F 17/24* | (2006.01) | |

(52) U.S. Cl.
CPC ..... *G06Q 30/0226* (2013.01); *G06F 16/9554* (2019.01); *G06F 17/243* (2013.01)

(58) Field of Classification Search
CPC .................................................. G06Q 30/02
See application file for complete search history.

(56) References Cited

U.S. PATENT DOCUMENTS

| | | | |
|---|---|---|---|
| 8,301,555 B2 | 10/2012 | Etheredge et al. | |
| 2002/0062249 A1* | 5/2002 | Iannacci | ........... G06Q 20/10 |
| | | | 705/14.1 |
| 2002/0188509 A1* | 12/2002 | Ariff | ........... B01J 23/6562 |
| | | | 705/14.25 |
| 2008/0098292 A1* | 4/2008 | Embry | ........... G06F 17/243 |
| | | | 715/226 |
| 2008/0141117 A1* | 6/2008 | King | ........... G06F 17/30011 |
| | | | 715/238 |
| 2009/0283582 A1* | 11/2009 | Doan | ........... G06Q 30/02 |
| | | | 235/375 |
| 2011/0047023 A1* | 2/2011 | Lieblang | ........... G06Q 30/02 |
| | | | 705/14.36 |
| 2011/0191156 A1* | 8/2011 | Etheredge | ........... G06Q 30/0224 |
| | | | 705/14.25 |
| 2011/0271173 A1* | 11/2011 | Ait-Mokhtar | ........... G06F 17/243 |
| | | | 715/226 |
| 2013/0112746 A1* | 5/2013 | Krell | ........... G06K 5/00 |
| | | | 235/380 |

* cited by examiner

*Primary Examiner* — Vincent M Cao

(57) ABSTRACT

A driver's license parser including: a data accessor configured for accessing data from a scanned bar code of a driver's license of a customer; a data parser configured for parsing the data to achieve parsed data, wherein the parsed data represents a customer profile of the customer; a parsed data storer configured for causing the parsed data to be stored; a comparer configured for comparing the parsed data with requirements of a loyalty program enrollment policy to determine what information of the parsed data falls within the loyalty program enrollment policy; a customer profile validity determiner configured for, based on the comparing, determining a validity of the customer profile; and a form populator configured for, if the customer profile is determined to be valid, populating at least one form with the parsed data to achieve at least one populated form.

16 Claims, 4 Drawing Sheets

DRIVERS LICENSE PARSER

CROSS-REFERENCE TO RELATED APPLICATIONS

This application claims priority to and benefit of U.S. Patent Application No. 61/947,360, filed on Mar. 3, 2014 entitled "DRIVERS LICENSE PARSE[R]" by Tim Pontious, and assigned to the assignee of the present application.

BACKGROUND

Certain inefficiencies exist when it comes to a consumer filling out forms, such as medical documents, credit card applications, employment applications, loyalty program applications, and the like. The consumer spends an inordinate amount of time filling out the forms and the merchant spends valuable time retyping some of the information from the forms into yet more computer-generated forms. Further inefficiencies result when, after the form is filled out, the consumer is turned down for such things as the extension of credit and employment.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description should not be understood as being drawn to scale unless specifically noted.

SUMMARY

The following is a summary of at least one embodiment of the present technology:

An article of manufacture, which includes a computer readable medium having stored therein a computer program for automatically populating a form using information from a scanned bar code of a driver's license is described herein. The computer program includes: a first code segment which, when executed on a computer, accesses data from a scanned bar code of a driver's license of a customer; a second code segment which, when executed on the computer, parses the data to achieve parsed data, wherein the parsed data represents a customer profile of the customer; a third code segment which, when executed on the computer, causes the parsed data to be stored; a fourth code segment which, when executed on the computer, compares the parsed data with requirements of a loyalty program enrollment policy to determine what information of the parsed data falls within the loyalty program enrollment policy; a fifth code segment which, when executed on the computer, based on the comparing, determines a validity of the customer profile; and a sixth code segment which, when executed on a computer, if the customer profile is determined to be valid, populates at least one form with the parsed data to achieve at least one populated form.

DESCRIPTION OF EMBODIMENTS

Reference will now be made in detail to various embodiments, examples of which are illustrated in the accompanying drawings. While various embodiments are discussed herein, it will be understood that they are not intended to be limiting. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding. However, embodiments may be practiced without one or more of these specific details. In other instances, well known methods, procedures, components, and circuits have not been described in detail as not to unnecessarily obscure aspects of the described embodiments.

Notation and Nomenclature

Figure 1:
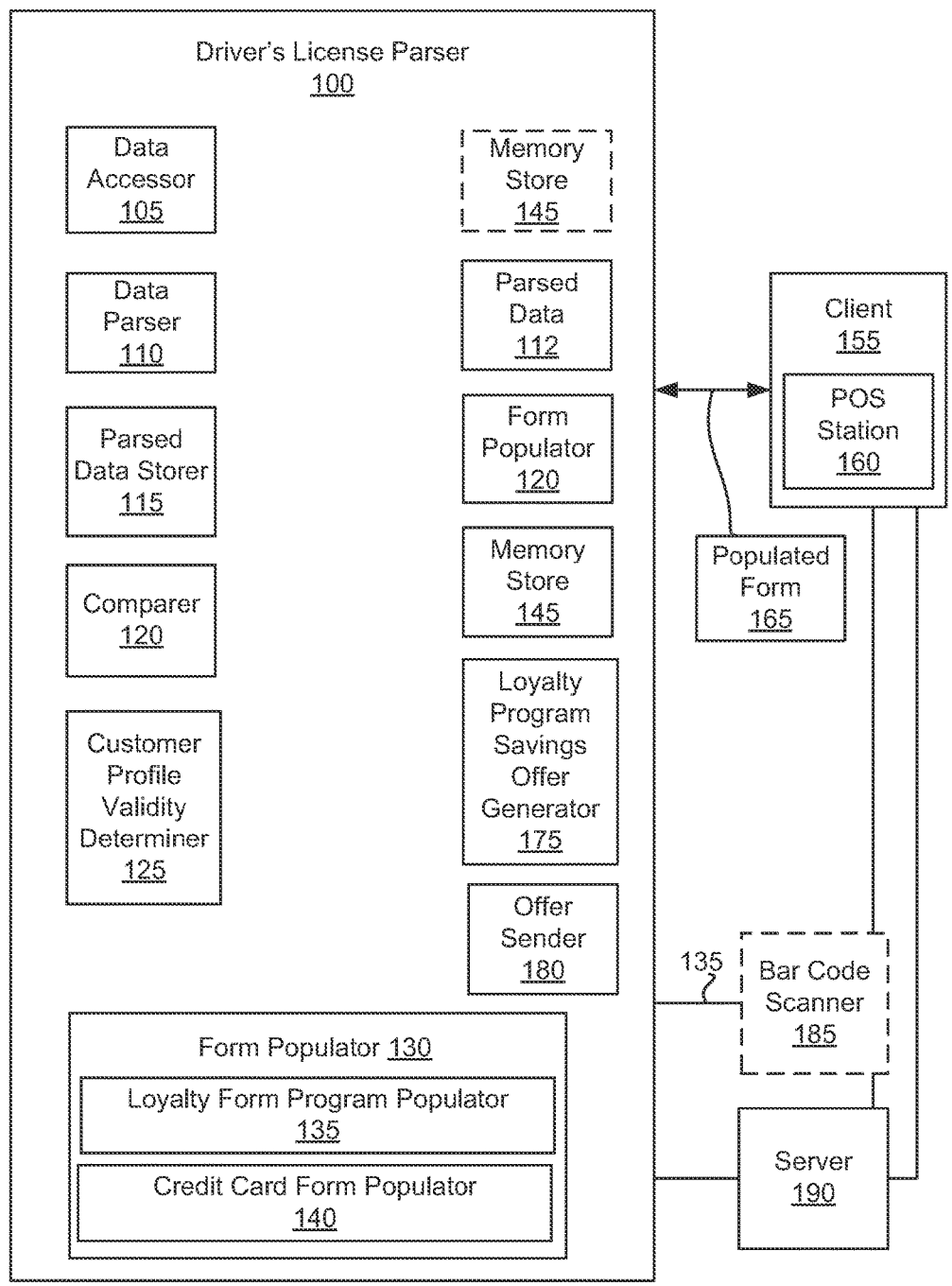
FIG. 1 is a block diagram that illustrates an embodiment of a driver's license parser, in accordance with an embodiment.
Figure 2:
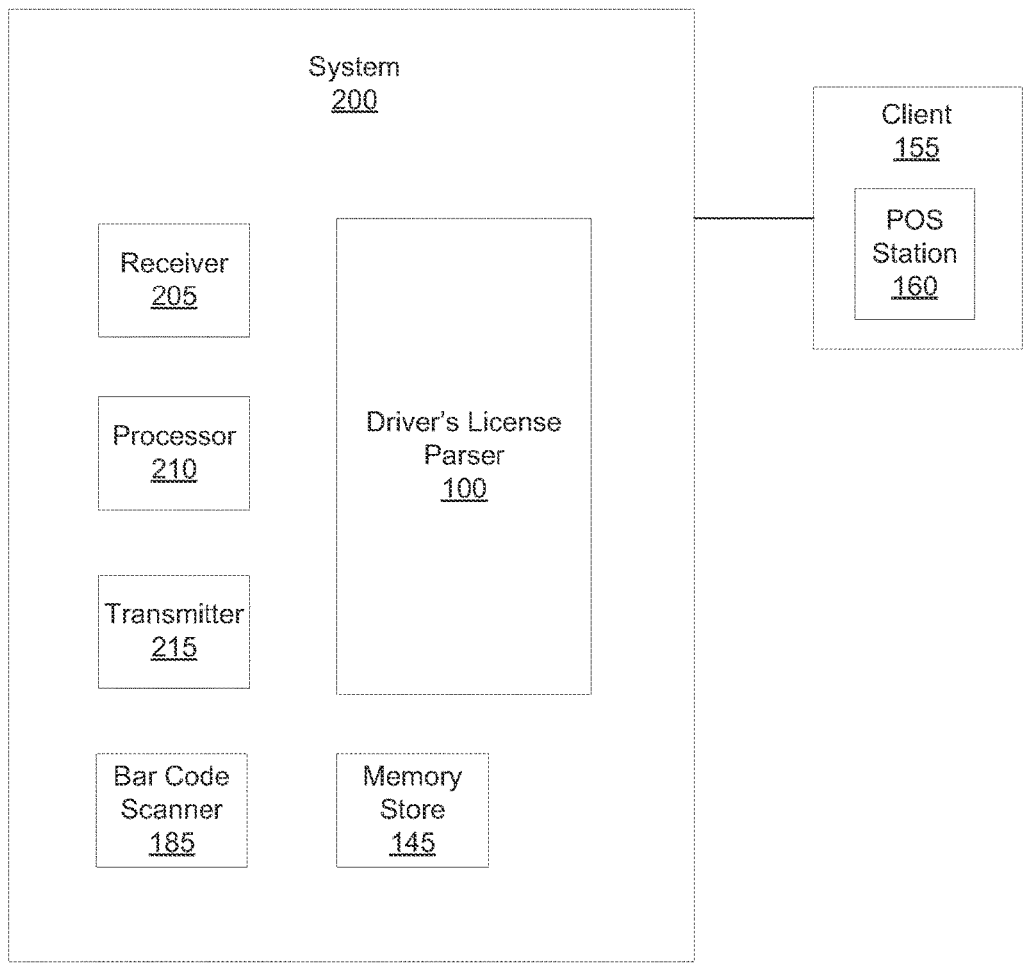
FIG. 2 is a block diagram that illustrates an embodiment of a system including a driver's license parser, in accordance with an embodiment.

Unless specifically stated otherwise as apparent from the following discussions, it is appreciated that throughout the present Description of Embodiments, discussions utilizing terms such as "accessing," "parsing", "storing", "comparing", "determining", "populating", "sending", "generating", or the like, often refer to the actions and processes of an electronic computing device (or portion thereof), module or system, such as, but not limited to, a driver's license parser (See FIGS. 1 and 2). The electronic computing device/module/system transmits, receives, stores, manipulates and/or transforms signals represented as physical (electrical) quantities within the circuits, components, logic, and the like, of the electronic computing device/system into other signals similarly represented as physical electrical quantities within the electronic computing device/system or within or transmitted to other electronic computing devices/systems.

The following definitions apply:

"Client": A retail partner of the system described herein for automatically populating a form using information from a scanned bar code of a driver's license.

"Client System": The client's Point of Service system.

"Customer": The client's consumer/customer.

"Customer Facing Device": A device that allows direct interaction or communication with customers (such as a signature capture, pin pad device, or bar code scanner).

"Driver's License": The term, "driver's license", includes any government issued identification. For example, but not limited to such example, a government issued identification may refer to a state issued driver's license, a state identification, a military identification, a federal identification, a locally-issued identification, a province in Canada, etc. The government issued identification may be issued by any governmental authority.

"Points of Service": Any channel where a transaction can be processed for a customer (i.e., Catalog, Web, Retail, Mobile).

SSN": Any governmentally assigned social security number (e.g., United States, Canada, etc.).

Overview of Embodiments and Discussion

Certain inefficiencies exist when it comes to filling out forms, such as medical documents, credit card applications, employment applications, loyalty program applications, and the like. Further inefficiencies result, when after the form is filled out, the consumer is turned down for such things as the extension of credit and employment. Embodiments provide a way for consumers to be screened before such forms are filled out and for these forms to be efficiently completed without the time and expense to both the consumer and the merchant.

The following is a high-level non-limiting example of embodiments. A fishing store located in Montana asks Fred if he would like to be considered for their loyalty program. Fred decides that he would like to receive the member benefits of a loyalty program. The store clerk takes Fred's driver's license and scans the bar code. The driver's license parser described herein will determine if the information appearing on the bar code of Fred's driver's license fits within the restrictions dictated by the fishing store. In order to offer the loyalty card for the loyalty program, the fishing store's only restriction is that the residence of the customer who receives the loyalty card must be in the state of Montana. The "customer profile validity determiner" of the invention determines that Fred's address is in fact in the state of Montana, and therefore, Fred's profile meets the restrictions and is therefore valid. The driver's license parser will then automatically populate the loyalty program form with Fred's personal information garnered from the driver's license scanned bar code data. For example, the driver's license parser inserts Fred's address and driver's license number into the loyalty program form. Thus, embodiments provide a method for automatically populating a form using scanned information from a bar code of a driver's license, thereby reducing the inefficiencies of a consumer and/or merchant manually filling out forms with the consumer's information. Further, since the driver's license parser is enabled to "screen" a consumer to make sure that the customer's profile is within the restrictions before forms are filled out, further inefficiencies are avoided.

The following discussion will begin with a description of a driver's license parser, with reference to FIGS. 1 and 2. The discussion will follow with a description of a method of operation for automatically populating a form using information from a scanned bar code of a driver's license, with reference to FIGS. 1-3. The discussion concludes with a description of an example computer system with which or upon which various embodiments of the present technology may be implemented.

Embodiments of a Driver's License Parser

FIGS. 1 and 2 depict block diagrams that illustrates an embodiment of a driver's license parser 100 and a system 200 that includes the driver's license parser 100. The driver's license parser 100 includes the following modules coupled with a computer: a data accessor 105; a data parser 110; a parsed data storer 115; a comparer 120; a customer profile validity determiner 125; and a form populator 130. In various optional embodiments, the driver's license parser 100 further includes a form sender 170; a loyalty program savings offer generator 175; and an offer sender 180. The form populator 130 optionally includes a loyalty form program populator 135 and a credit account form populator 140.

FIG. 1 further depicts the driver's license parser 100 coupled with, via wire and/or wirelessly, the bar code scanner 185 and the client 155. In one embodiment, the client 155 includes a point of service (POS) station 160. The client 155 controls the forms that are filled out. While the discussion herein is focused on populating loyalty program forms and credit account application forms, it should be appreciated that the concepts herein may be applied to filing in other types of forms using the scanned bar code of a driver's license, such as, but not limited to, medical forms and employment applications. It should also be appreciated that the POS station 160 may be located somewhere other than at the client 155. It should also be appreciated that a customer may possess the scanning technology (e.g., tablet with an integrated bar code scanner), wherein the customer is positioned remotely from the client.

The data accessor 105 is configured for accessing (i.e., receiving or retrieving) data from a scanned bar code of a driver's license of a customer. The data accessor 105 may either, via wire and/or wirelessly, receive the scanned bar code data from the receiver 205 (see FIG. 2) or retrieve the scanned bar code data from the receiver 205. In one embodiment, the client 155 is operating the bar code scanner 185. For example, the client 155 may be a retailer that is communicatively coupled with the driver's license parser 100. The store associate at the retail store is operating the POS station 160 and is also providing, for use to customers, the bar code scanner 185.

In another embodiment, the driver's license parser 100 accesses the scanned bar code data from a third party that is operating a bar code scanner 185, wherein the third party and the driver's license parser 100 are communicatively coupled. In another embodiment, the driver's license parser 100 accesses the scanned bar code data from the third party, which itself had accessed the scanned bar code data from the bar code scanner 185 that is located at a location other than the third party and the driver's license parser 100. It should be appreciated that the "third party" may be any entity other than the driver's license parser 100, the server 190, and the client 155.

The data parser 110 is configured for parsing the data accessed from the scanned bar code to achieve the parsed data 125. The term "parsing" refers to breaking the scanned bar code data into smaller chunks by following a set of rules, so that it can be more easily interpreted, managed, or transmitted by a computer. The data parser 110 breaks the scanned bar code data into smaller chunks, according to a set of preprogrammed set of rules relating to, but not limited to, any of the following topics: the address appearing on the driver's license; the age of the driver's license owner; the weight and/or height of the driver's license owner; the driver's license number; the expiration date of the driver's license owner; and the birthdate of the driver's license holder. These "chunks" are translated into a digital form such that they may be used to automatically populate various forms and transmitted to a client. Additionally, the process of "parsing" is commonly known to those knowledgeable in the field of technology.

The parsed data storer 115 is configured for causing the parsed data 112 to be stored. This storage may occur at the memory store 145 located at the driver's license parser 100, in one embodiment. In another embodiment, the memory store 145 is located external to the driver's license parser 100, such as at a server 190. In one embodiment, the server 190 is optionally coupled with the driver's license parser 100 and/or the client 155 via wire and/or wirelessly. In one embodiment, a business entity controls the server 210. The server 210, in one embodiment, is capable of uploading updates to the driver's license parser 100.

The comparer 120 is configured for comparing the parsed data 112 with requirements of a loyalty program enrollment policy 150 to determine what information of the parsed data 112 falls within the loyalty program enrollment policy 150. Examples of requirements of the loyalty program enrollment policy 150 include, but are not limited to, restrictions on the residency and age (minors) of the customer. For example, a retail store may want to only offer its loyalty card to inner city residents or to non-minors. The loyalty program enrollment policy 150 is drafted to include the retailer's restrictions. The comparer 120 will determine what information of the parsed data 112 is within the restrictions imposed within the loyalty program enrollment policy 150, and will also determine the information of the parsed data 112 that falls outside of these restrictions. For example, the bar code of a 16 year old's driver's license is scanned. The loyalty program enrollment policy 150 includes a restriction that only those 18 years old and older may receive an offer to be registered in the retailer's loyalty program. Thus, the 16 year old's customer profile would include information (that of being 16 years old instead of the required age of 18 years old) that would fall outside of the requirements of the loyalty program enrollment policy 150.

The customer profile validity determiner 125 is configured for, based on the comparing performed by the comparer 120, determining a validity of the customer profile. The customer profile is that information that is associated with the customer, garnered from the scanned bar code of the customer's driver's license (and/or, in another embodiment, which the customer entered into a customer-facing device. It should be appreciated that the customer-facing device may be a device located at a store in which the customer is shopping, or may be coupled via wire and/or wirelessly with a mobile device (e.g., tablet, phone, laptop computer, etc.) and/or a desktop computer). The customer profile validity determiner 125 will determine that the customer profile is "valid" if the parsed data 112 does not fall outside of the restrictions placed into the loyalty program enrollment policy 150.

The form populator 130 is configured for, if the customer profile is determined to be valid, populating at least one form with the parsed data 112 to achieve at least one populated form 165.

The memory store 145 is configured for storing the parsed data 112 and the loyalty program enrollment policy 150. In one embodiment, the memory store 145 is a data storage unit, such as the data storage unit 412 of FIG. 4.

The form sender 180 is configured for sending the at least one populated form 165 to a transmitter 215 (see FIG. 2) that is coupled with the driver's license parser 100.

In one embodiment, the loyalty program savings offer generator 175 is configured for, if the customer profile is determined to be valid, and based upon the customer profile of the customer, generating a loyalty program savings offer for the customer. This loyalty program savings offer is any predetermined savings, such as, but not limited to, the following examples: 50% off any item with a purchase of any full-priced item over $500; the retail store will pay the taxes on any purchase occurring over the week-end; and 10% off all items when purchased before the current month ends.

The offer sender 180 is configured for sending the loyalty program savings offer to the transmitter that is coupled with the driver's license parser 100 and the client 155.

FIG. 2 shows a system 200 for automatically populating a form using scanned information from a bar code of a driver's license. The system 200 includes the following: the driver's license parser 100; a receiver 205; a processor 210; a transmitter 215; a bar code scanner 185; and a memory store 145. The system is shown coupled with the client 155, which includes the POS station 160.

Example Methods of Operation

Figure 3:
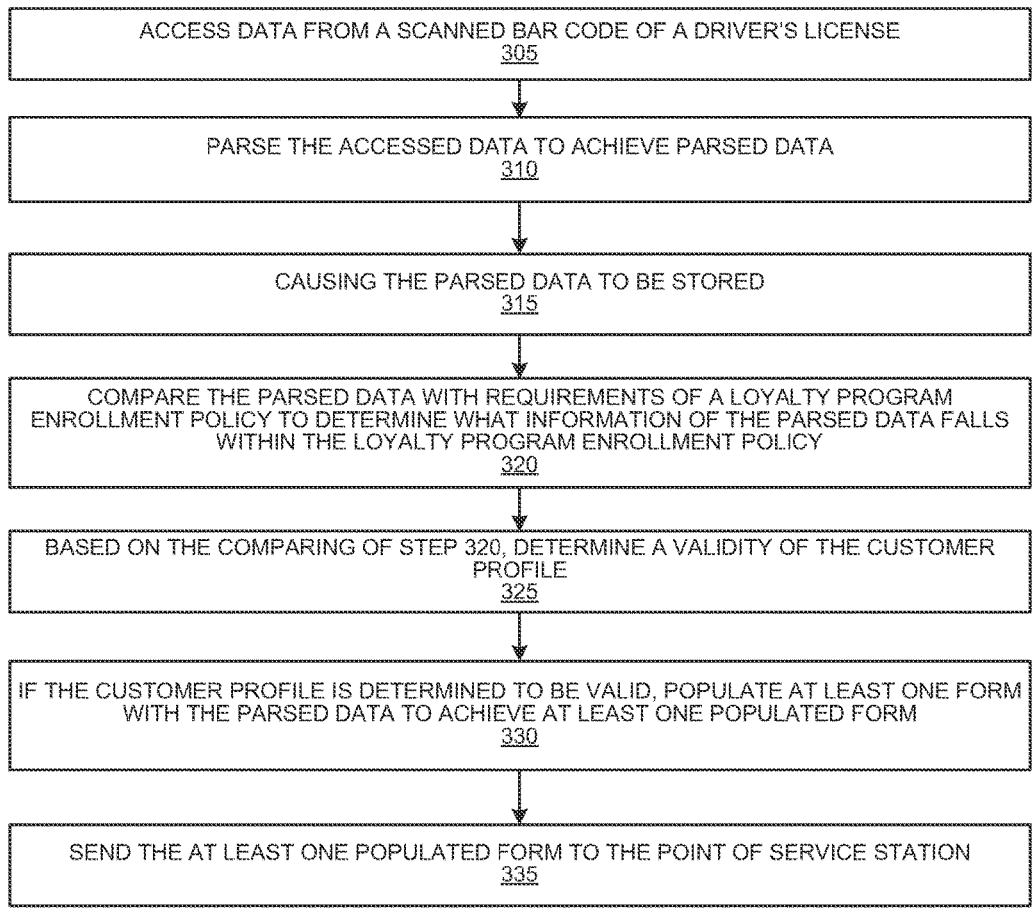
FIG. 3 depicts a flow diagram for a method for automatically populating a form using scanned information from a bar code of a driver's license, in accordance with an embodiment.

The following discussion sets forth in detail some example methods of operation of embodiments. With reference to FIGS. 1-3, flow diagrams of method 300 illustrates an example procedure used by various embodiments. Method 300 includes some procedures that, in various embodiments, are carried out by a processor under the control of computer-readable and computer-executable instructions. In various embodiments, these computer-readable and computer-executable instructions are described as "code segments", and presented separately (e.g., first codes segment, second code segment, etc.) to describe such instructions. In this fashion, procedures described herein and in conjunction with these flow diagrams, alone or in combination, are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, and optical disks, solid-state disks, any or all of which may be employed within a virtualization infrastructure. The computer-readable and computer-executable instructions, which reside on tangible computer readable storage media, are used to control or operate in conjunction with, for example, one or some combination of processors of a virtual machine. It is appreciated that the processor(s) may be physical or virtual or some combination (it should also be appreciated that a virtual processor is implemented on physical hardware). Although specific procedures are disclosed in method 300, such procedures are examples. That is, embodiments are well suited to performing various other procedures or variations of the procedures recited in method 300, alone or in combination. Likewise, in some embodiments, the procedures in method 300, alone or in combination, may be performed in an order different than presented and/or not all of the procedures described in one or more of these flow diagrams may be performed. It is further appreciated that procedures described in method 300, alone or in combination, may be implemented in hardware, or a combination of hardware with firmware and/or software.

FIG. 3 is a flow diagram of a method 300 for automatically populating a form using scanned information from a bar code of a driver's license, in accordance with an embodiment. Although specific procedures are disclosed in method 300, embodiments are well suited to performing various other procedures or variations of the procedures recited in method 300. It is appreciated that the procedures in method 300 may be performed in an order different than presented, that not all of the procedures in method 300 may be performed, and that additional procedures to those illustrated and described may be performed. All of, or a portion of, the procedures described by method 300 can be implemented by a processor or computer system executing instructions which reside, for example, on computer-usable/readable media. The following discussion of method 300 references FIGS. 1-4 unless specifically noted otherwise.

At step 305 of method 300, in one embodiment and as described herein, data from a scanned bar code of a driver's license of a customer is accessed.

At step 310 of method 300, in one embodiment and as described herein, the accessed data is parsed to achieve parsed data, wherein the parsed data represents a customer profile of said customer.

At step 315 of method 300, in one embodiment and as described herein, the parsed data 112 is caused to be stored. In one embodiment, this occurs at the memory store 145 residing at the driver's license parser 100.

At step 320 of method 300, in one embodiment and as described herein, the parsed data 112 is compared with requirements of a loyalty program enrollment policy 150 to determine what information of the parsed data 112 falls within the loyalty program enrollment policy 150.

At step 325 of method 300, in one embodiment and as described herein, based on the comparing, a validity of the customer profile is determined.

At step 330 of method 300, in one embodiment and as described herein, if the customer profile is determined to be valid, at least one form with the parsed data 112 is populated to achieve at least one populated form 165. In one embodiment, a pre-approved loyalty program form is populated. In another embodiment, a credit form is populated.

At step 335 of method 300, in one embodiment and as described herein, the at least one populated form 165 is sent to the point of service station 160.

At step 340 of method 300, in one embodiment and as described herein, the at least one populated form 165 is sent to an email address of the customer.

At step 345 of method 300, in one embodiment and as described herein, if the customer profile is determined to be valid, then a loyalty program savings offer is generated.

Example Computer System

Figure 4:
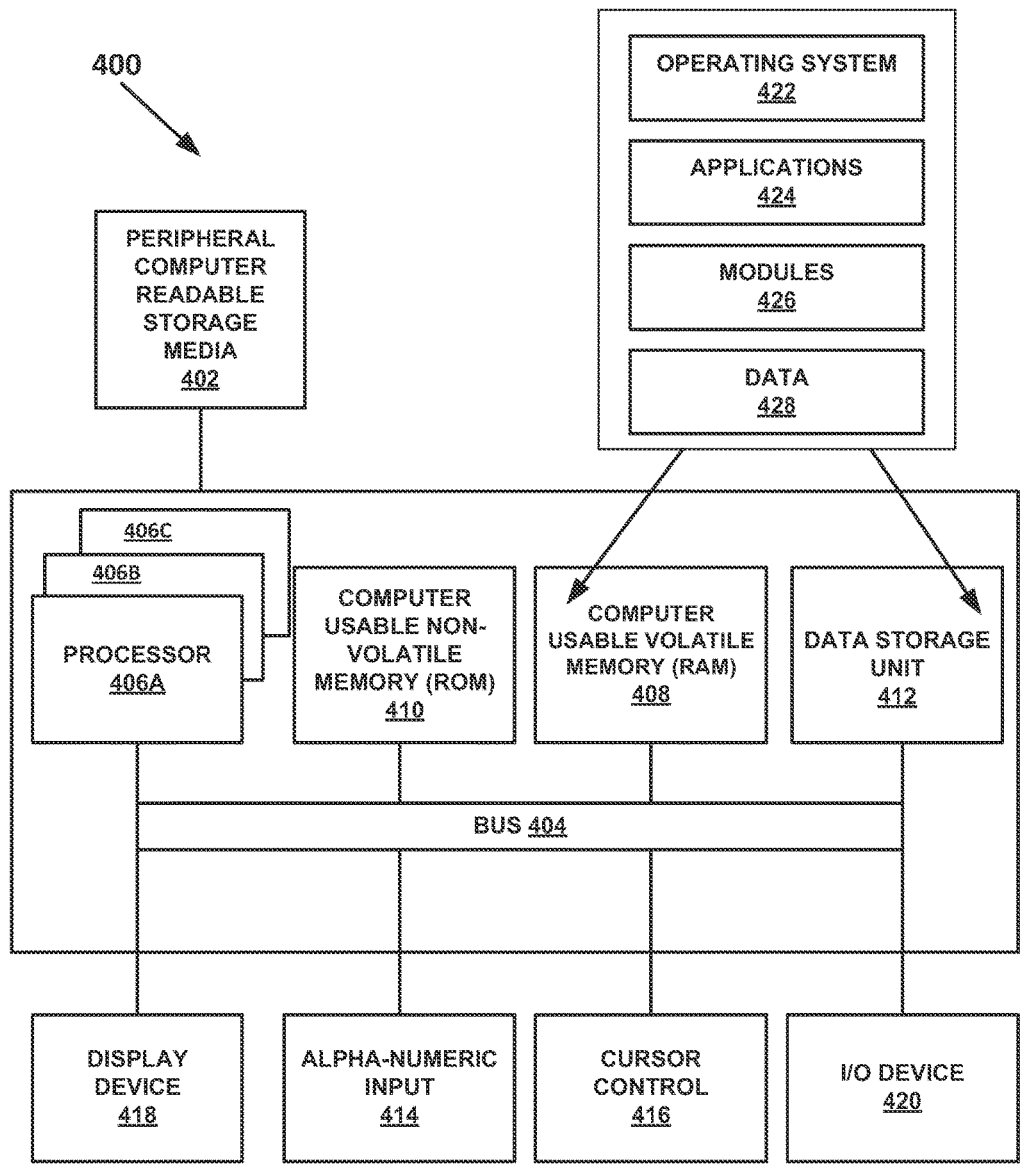
FIG. 4 is a block diagram of an example computer system with which or upon which various embodiments of the present invention may be implemented.

With reference now to FIG. 4, all or portions of some embodiments described herein are composed of computer-readable and computer-executable instructions that reside, for example, in computer-usable/computer-readable storage media of a computer system. That is, FIG. 4 illustrates one example of a type of computer (computer system 400) that can be used in accordance with or to implement various embodiments which are discussed herein. It is appreciated that computer system 400 of FIG. 4 is only an example and that embodiments as described herein can operate on or within a number of different computer systems including, but not limited to, general purpose networked computer systems, embedded computer systems, routers, switches, server devices, client devices, various intermediate devices/nodes, stand alone computer systems, distributed computer systems, media centers, handheld computer systems, multimedia devices, and the like. Computer system 400 of FIG. 4 is well adapted to having peripheral non-transitory computer-readable storage media 402 such as, for example, a floppy disk, a compact disc, digital versatile disc, other disc based storage, universal serial bus "thumb" drive, removable memory card, and the like coupled thereto.

System 400 of FIG. 4 includes an address/data bus 404 for communicating information, and a processor 406A coupled with bus 404 for processing information and instructions. As depicted in FIG. 4, system 400 is also well suited to a multi-processor environment in which a plurality of processors 406A, 406B, and 406C are present. Conversely, system 400 is also well suited to having a single processor such as, for example, processor 406A. Processors 406A, 406B, and 406C may be any of various types of microprocessors. System 400 also includes data storage features such as a computer usable volatile memory 408, e.g., random access memory (RAM), coupled with bus 404 for storing information and instructions for processors 406A, 406B, and 406C.

System 400 also includes computer usable non-volatile memory 410, e.g., read only memory (ROM), coupled with bus 404 for storing static information and instructions for processors 406A, 406B, and 406C. Also present in system 400 is a data storage unit 412 (e.g., a magnetic or optical disk and disk drive) coupled with bus 404 for storing information and instructions. System 400 also includes an optional alphanumeric input device 414 including alphanumeric and function keys coupled with bus 404 for communicating information and command selections to processor 406A or processors 406A, 406B, and 406C. System 400 also includes an optional cursor control device 416 coupled with bus 404 for communicating user input information and command selections to processor 406A or processors 406A, 406B, and 406C. In one embodiment, system 400 also includes an optional display device 418 coupled with bus 404 for displaying information.

Referring still to FIG. 4, optional display device 418 of FIG. 4 may be a liquid crystal device, cathode ray tube, plasma display device or other display device suitable for creating graphic images and alphanumeric characters recognizable to a user. Optional cursor control device 416 allows the computer user to dynamically signal the movement of a visible symbol (cursor) on a display screen of display device 418 and indicate user selections of selectable items displayed on display device 418. Many implementations of cursor control device 416 are known in the art including a trackball, mouse, touch pad, joystick or special keys on alphanumeric input device 414 capable of signaling movement of a given direction or manner of displacement. Alternatively, it will be appreciated that a cursor can be directed and/or activated via input from alphanumeric input device 414 using special keys and key sequence commands. System 400 is also well suited to having a cursor directed by other means such as, for example, voice commands. System 400 also includes an I/O device 420 for coupling system 400 with external entities. For example, in one embodiment, I/O device 420 is a modem for enabling wired or wireless communications between system 400 and an external network such as, but not limited to, the Internet.

Referring still to FIG. 4, various other components are depicted for system 400. Specifically, when present, an operating system 422, applications 424, modules 726, and data 428 are shown as typically residing in one or some combination of computer usable volatile memory 408 (e.g., RAM), computer usable non-volatile memory 410 (e.g., ROM), and data storage unit 412. In some embodiments, all or portions of various embodiments described herein are stored, for example, as an application 424 and/or module 426 in memory locations within RAM 408, computer-readable storage media within data storage unit 412, peripheral computer-readable storage media 402, and/or other tangible computer-readable storage media.

The invention claimed is:

1. A computing device comprising:
one or more processors to:
access data received from a scanner after the scanner has scanned a bar code of a driver's license of a customer;
parse said data to achieve parsed data, wherein said parsed data represents a customer profile of said customer,
the parse of said data to break the data received from the scanner into smaller chunks of data, the parse of said data based on a set of preprogrammed rules such that said parsed data falls into a plurality of customer topics from the group consisting of: an address, an age, a weight, a height, a driver's license number, a driver's license expiration date, and a birthday;

the parse of said data to provide easier transmission of the parsed data versus transmission of the data;

transmit at least a portion of the parsed data to a database, the database to store said parsed data;

compare said parsed data with requirements of a loyalty program enrollment policy to determine what information of said parsed data falls within said loyalty program enrollment policy, said loyalty program enrollment policy including an age restriction, said age restriction limiting so that only those 18 years old and older are able to receive an offer to be registered in a retailer's loyalty program;

determine, based on said comparing, a validity of said customer profile;

populate, if said customer profile is determined to be valid, at least one form with said parsed data to achieve at least one populated form; and transmit said populated form to a mobile device of said customer.

2. The computing device of claim 1, where the one or more processors are further to:
populate a pre-approved loyalty program form.

3. The computing device of claim 1, where the one or more processors are further to:
populate a pre-approved credit account application form.

4. The computing device of claim 1, where the one or more processors are further to:
send said form to a point of service station.

5. The computing device of claim 1, where the one or more processors are further to:
send said populated form to said mobile device of said customer via an email address of said customer.

6. The computing device of claim 1, where the one or more processors are further to:
generate, if said customer profile is determined to be valid, a loyalty program savings offer for said customer.

7. A non-transitory computer-readable medium storing instructions, the instructions comprising:
one or more instructions that, when executed by one or more processors, cause the one or more processors to:
access data received from a scanner after the scanner has scanned a bar code of a driver's license of a customer;
parse said data to achieve parsed data, wherein said parsed data represents a customer profile of said customer,
the parse of said data to break the data received from the scanner into smaller chunks of data,
the parse of said data based on a set of preprogrammed rules such that said parsed data falls into a plurality of customer topics from the group consisting of: an address, an age, a weight, a height, a driver's license number, a driver's license expiration date, and a birthday;
the parse of said data to provide easier transmission of the parsed data versus transmission of the data;
transmit at least a portion of the parsed data to a database, the database to store said parsed data;
compare said parsed data with requirements of a loyalty program enrollment policy to determine what information of said parsed data falls within said loyalty program enrollment policy,
said loyalty program enrollment policy including an age restriction, said age restriction limiting so that only those 18 years old and older are able to receive an offer to be registered in a retailer's loyalty program;
determine, based on said comparing, a validity of said customer profile;
populate, if said customer profile is determined to be valid, at least one form with said parsed data to achieve at least one populated form; and
transmit said populated form to a mobile device of said customer.

8. The non-transitory computer-readable medium of claim 7, where the one or more instructions, when executed by the one or more processors, further cause the one or more processors to:
store said parsed data and said loyalty program enrollment policy.

9. The non-transitory computer-readable medium of claim 7, where the one or more instructions, when executed by the one or more processors, further cause the one or more processors to:
generate, if said customer profile is determined to be valid and based upon said customer profile of said customer, a loyalty program savings offer for said customer.

10. The non-transitory computer-readable medium of claim 7, where the one or more instructions, when executed by the one or more processors, further cause the one or more processors to:
populate a pre-approved loyalty program form.

11. The non-transitory computer-readable medium of claim 7, where the one or more instructions, when executed by the one or more processors, further cause the one or more processors to:
populate a pre-approved credit account application form.

12. A system for automatically populating a form using information from a scanned bar code of a driver's license, said system comprising:
a scanner to scan a bar code of a driver's license of a customer;
a receiver to receive information from the scan of the bar code of the driver's license of the customer by the scanner;
a processor to:
access the information received from the scanner;
parse the information to achieve parsed information, wherein said parsed information represents a customer profile of said customer,
the parse of said information to break the information received from the scanner into smaller chunks of data,
the parse of said information based on a set of preprogrammed rules such that said parsed information falls into a plurality of customer topics from the group consisting of: an address, an age, a weight, a height, a driver's license number, a driver's license expiration date, and a birthday;
the parse of said information to provide easier transmission of the parsed information versus transmission of the information;
storing at least a portion of the parsed information at a database;
compare said parsed information with requirements of a loyalty program enrollment policy to determine what information of said parsed information falls within said loyalty program enrollment policy,
said loyalty program enrollment policy including an age restriction, said age restriction limiting so that only those 18 years old and older are able to receive an offer to be registered in a retailer's loyalty program;
based on said comparing, determining a validity of said customer;
populate, if said customer profile is determined to be valid, at least one form with said parsed information to achieve at least one populated form; and
a transmitter to transmit said populated form to a mobile device of said customer.

13. The system of claim 12, wherein said populated form comprises a pre-approved loyalty form program.

14. The system of claim 12, wherein said populated form comprises a pre-approved credit account application form.

15. The system of claim 12, wherein said processor further to:
generate, if said customer profile is determined to be valid and based upon said customer profile of said customer, a loyalty program savings offer for said customer.

16. The system of claim 15, wherein said processor further to:
transmit said loyalty program savings offer to the mobile device of said customer.

\* \* \* \* \*